F. J. HAGEN. 5 Sheets—Sheet 1.

Assignor to THE EUREKA CIGAR MACHINE COMPANY.

CIGAR BUNCHING MACHINE.

No. 11,150. Reissued Mar. 10, 1891.

F. J. HAGEN. 5 Sheets—Sheet 2

Assignor to THE EUREKA CIGAR MACHINE COMPANY.

CIGAR BUNCHING MACHINE.

No. 11,150. Reissued Mar. 10, 1891.

WITNESSES:

Roscoe C. Toombs

Burnham Kalisch

INVENTOR:

F. J. Hagen

BY

Clarence A. O'Brien

ATTORNEYS

5 Sheets—Sheet 3.

F. J. HAGEN.

Assignor to THE EUREKA CIGAR MACHINE COMPANY.

CIGAR BUNCHING MACHINE.

No. 11,150. Reissued Mar. 10, 1891.

WITNESSES:

Roscoe C. Tombs

Burnham Kalisch

INVENTOR:

F. J. Hagen

BY

Clarence P. Byrnes

ATTORNEYS

F. J. HAGEN. 5 Sheets—Sheet 4

Assignor to THE EUREKA CIGAR MACHINE COMPANY.

CIGAR BUNCHING MACHINE.

No. 11,150. Reissued Mar. 10, 1891.

WITNESSES:

Roscoe C. Toombs

Burnham Kalisch

INVENTOR:

F. J. Hagen

BY

Clarence A. Seger

ATTORNEYS

F. J. HAGEN. 5 Sheets—Sheet 5.

Assignor to THE EUREKA CIGAR MACHINE COMPANY.

CIGAR BUNCHING MACHINE.

No. 11,150. Reissued Mar. 10, 1891.

WITNESSES:

Roscoe C. Toombs

Burnham Kabisch

INVENTOR:

F. J. Hagen

BY

Clarence A. O'Brien

ATTORNEYS

UNITED STATES PATENT OFFICE.

FERDINAND J. HAGEN, OF NEW YORK, N. Y., ASSIGNOR TO THE EUREKA CIGAR MACHINE COMPANY, OF NEW JERSEY.

CIGAR-BUNCHING MACHINE.

SPECIFICATION forming part of Reissued Letters Patent No. 11,150, dated March 10, 1891.

Original No. 415,943, dated November 26, 1889. Application for reissue filed October 20, 1890. Serial No. 368,753.

*To all whom it may concern:*

Be it known that I, FERDINAND J HAGEN, of the city, county, and State of New York, have invented a new and useful Improvement in Cigar-Bunching Machines, of which the following is a specification.

This invention relates mainly to machines for making cigar-bunches in which the loose filler is fed into a mold having more or less the shape of a cigar and the filler in the mold then separated from the remainder and carried to a rolling and binding mechanism.

The principal object of this invention is to provide an efficient machine of this character in which, while large-sized scraps of tobacco are used as the filler and the necessity of chopping up the filler into smaller pieces of uniform size thus dispensed with, compact bunches will be formed of the proper shape and of an equal density throughout.

The invention comprises novel means of feeding the filler to and packing it evenly in the mold; also, a peculiar construction of mold and novel means of discharging the molded filler into the receiving-pocket of the rolling mechanism without allowing the compacted filler to expand.

I shall first describe in detail the mode in which I carry my invention into effect, and then point out its various features in the claims.

Reference is to be had to the accompanying drawings, forming part of this specification, in which—

Figure 1:
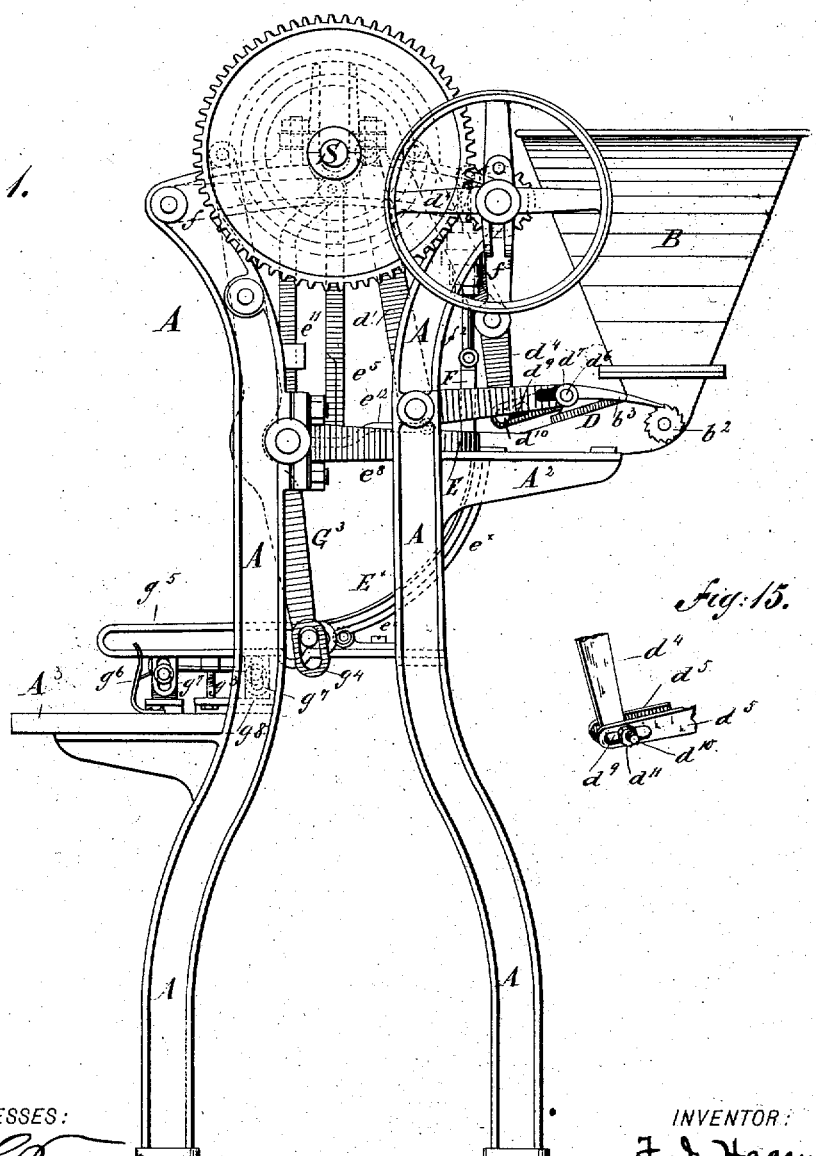
Figure 2:
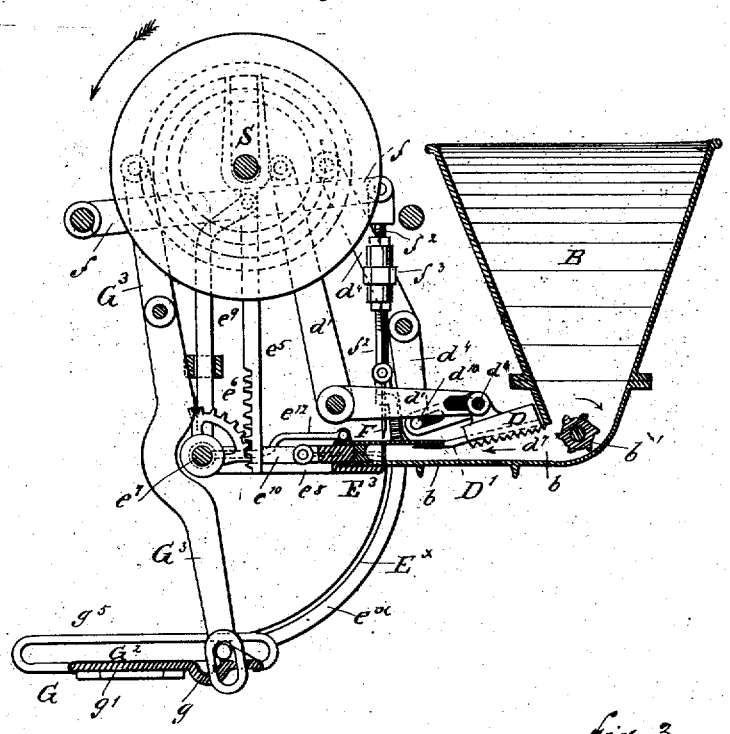
Figure 3:
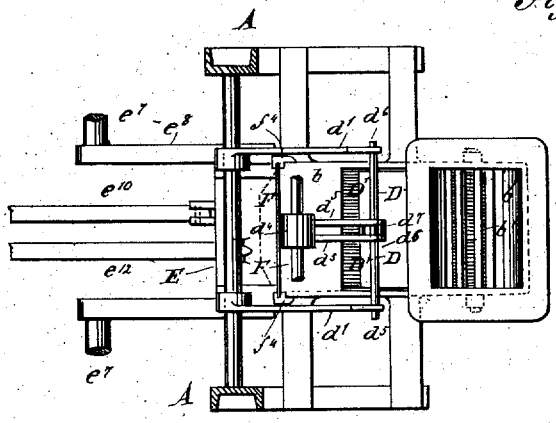
Figure 4:
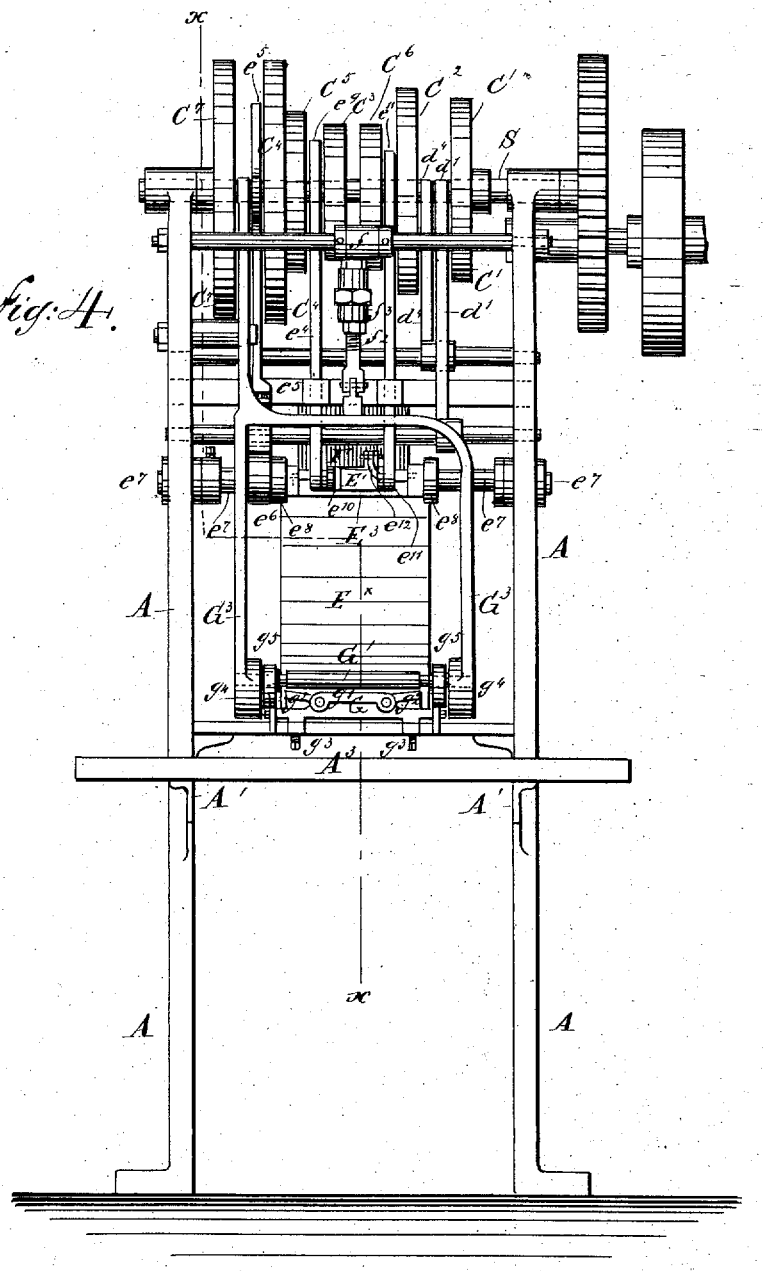
Figure 5:
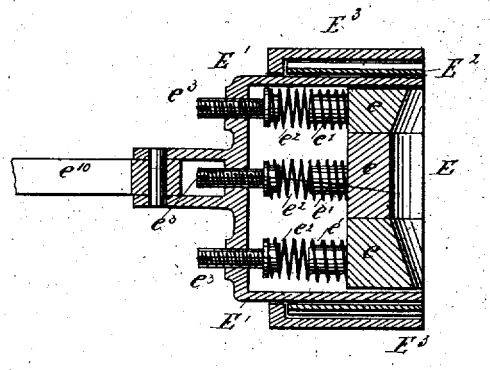
Figure 6:
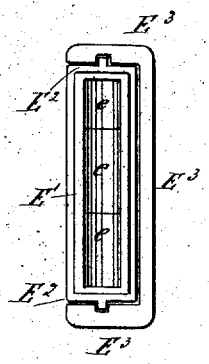
Figure 7:
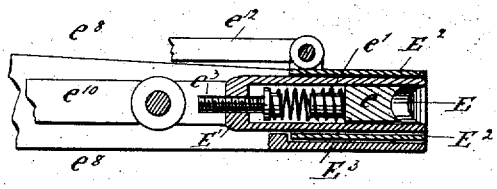
Figure 7A:
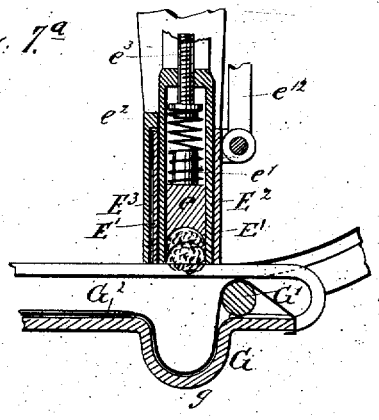
Figure 7B:
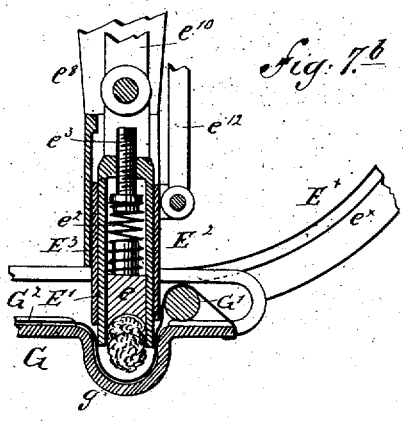
Figure 8:
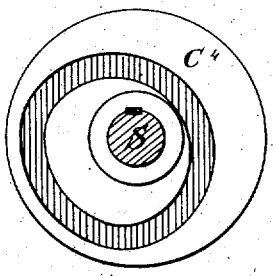

Figure 1 represents a side elevation of a cigar-bunching machine embodying my invention. Fig. 2 represents a vertical longitudinal section of a part of the said machine on the line X X, Fig. 4. Fig. 3 is a plan view of the feed mechanism of the same, the body of the supply-hopper being removed and parts being in section. Fig. 4 is a front elevation of the machine. Figs. 5, 6, and 7 are detail views of the mold of the same and its attachments. Figs. $7^a$ and $7^b$ are detail views showing the discharging action of the bunch-mold into the pocket of the rolling mechanism. Figs. 8 to 14 are side views of the different cams employed for operating the working parts of the machine. Fig. 15 is a detail view of the adjustable connection whereby the stroke of the feed-clamp may be regulated.

Like letters of reference designate corresponding parts in the several figures.

The supporting-frame A of the machine illustrated is composed of two upright side standards and two horizontal brackets A′ and $A^2$, of which the bracket A′ is located at the front end of the machine and serves to support the rolling mechanism, while the bracket $A^2$ is located at the rear end of the machine and serves to support a supply-hopper B and the feed mechanism. A driving-shaft S is supported in bearings at the upper parts of the standards and provided with cams C′ to $C^7$, which are shown in detail in Figs. 8 to 14, said cams serving by cam-grooves of proper shape to impart the required motion to the various working parts of the machine.

From the bottom of the supply-hopper B, in which the large-sized scraps of tobacco are placed, extends horizontally a throat *b*, which tapers forward for a part of its length. In the enlarged portion of the throat *b*, at its junction with the hopper B, is mounted a feed-wheel *b′*, provided with peripheral ribs and intervening pockets, which take up the loose filler and feed it forward into the contracted portion of the throat *b*. Intermittent rotary motion is imparted to the feed-wheel *b′* by a ratchet-wheel $b^2$, which is attached to the outer end of the shaft of the feed-roller *b′*, the teeth of said ratchet-wheel $b^2$ being inclined in a direction opposite to the ribs of the feed-wheel. The ratchet-wheel $b^2$ is engaged by a pawl $b^3$, which is applied to the pivot-rod $d^6$ of a feed-clamp D, as shown in Fig. 4. The pawl $b^3$ drops by its own weight into the teeth of the ratchet-wheel $b^2$ and turns the feed-wheel *b′* at each backward stroke of the feed-clamp D for one or more teeth, according to the quantity of tobacco to be fed into the throat B.

The feed-clamp D is guided in a top opening of the enlarged rear part of the throat *b*, and serrated at its under side, so as to take hold of the tobacco and feed it forward into the contracted front end of the throat *b*. The feed-clamp D is supported at a slight inclination to the bottom of the throat $b$, and receives longitudinally-reciprocating and laterally-vibrating motions by suitable levers from the cams on the shaft S—that is to say, the feed-clamp is first moved inward or lowered and moved forward in the top opening of the feed-throat, and then moved outward or raised and moved backward in the same. A yielding spring-plate D′ is attached to the lower front end of the feed-clamp D and extended along the under side of the top plate of the throat $b$ to a sufficient distance in the same to continually cover the opening in the throat outside the feed-clamp D, so that no parts of the tobacco fed forward by the feed-wheel $b'$ and clamp D can pass into said opening nor choke the same. The yielding plate or cover D′ is equal in width with the feed-clamp D and throat $b$ and remains in contact with the under side of the top plate of the throat, whatever be the position of the feed-clamp. The laterally—that is, inwardly and outwardly—vibrating motion is imparted to the feed-clamp D by an elbow-lever $d'$, which is fulcrumed to the supporting-frame A, and engaged at its upper end by the cam-groove of the cam C′, (shown in Fig. 10,) while its two lower arms engage the transverse pivot-rod $d^6$, that passes through a lug $d^7$ of the feed-clamp.

Figure 14:
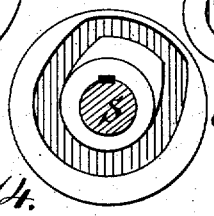

The longitudinally-reciprocating motion is imparted to the feed-clamp D by the cam $C^2$, Fig. 14, a fulcrumed lever $d^4$, and links $d^5$, which connect the lower arm of the fulcrumed lever $d^4$ with the pivot-rod $d^6$ of the feed-clamp, as shown clearly in Figs. 2 and 3. The pivot-rod $d^6$ is free to move in a slot at the ends of the lower arms of the lever $d'$, so as to take the longitudinally-reciprocating motion imparted to it by the lever $d^4$ and links $d^5$. The pivot-rod $d^6$ is rigidly applied to the lug $d^7$, so that the same is compelled to follow the longitudinally-reciprocating and laterally-vibrating motions imparted by the mechanism described. As the feed-clamp is pressed inward on the tobacco its serrated engaging face constituting also a platen or presser, it compresses a certain area of the tobacco, and as it is then moved forward it forces the tobacco forward into the contracted portion of the throat $b$, the inclination of the platen-like engaging face of the clamp during its motion corresponding to that of the roof of the throat, rendering the compression more gradual, preventing the breakage of the body of tobacco, and facilitating its passage through the tapering throat. The clamp is then moved outward out of engagement with the tobacco and then retracted for the next stroke.

There is an adjustable connection between the pivot-links $d^5$ and their actuating-lever $d^4$, whereby the forward stroke of the feed-clamp D can be regulated, and consequently the quantity of tobacco fed forward in the throat accurately determined. This adjustable connection may be effected by the bolt $d^{10}$ passing through slots $d^9$ in the links and through a hole in the arm $d^4$, said bolt being provided with a nut $d^{11}$ for clamping the links to the lever.

The front end or mouth of the throat $b$ communicates with a bunch-mold E, as shown in Fig. 2. The mold E is shown in detail in Figs. 5, 6, and 7, and consists of a number of interior interchangeable mold-sections $e$ $e$, the concave faces of which correspond in size and shape to the bunch to be produced, a mold-box E′, a shell $E^2$, and a mold-carrier $E^3$. The rear end of each mold-section $e$ is provided with a stud $e'$, to which is applied a spiral spring $e^2$, the opposite end of which is seated against a shoulder of a set-screw $e^3$, passing through the rear wall of the mold-box E′, which incloses the mold sections $e$, as shown in Fig. 5. By adjusting the set-screws $e^3$ from the outside the tension of the spiral springs $e^3$ is regulated, so that the required resistance to the tobacco fed to the mold by the feed-clamp is obtained in imitation to the hand-pressure employed in making a filler by hand.

Figure 11:
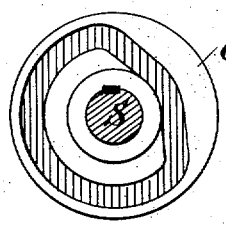
Figure 9:
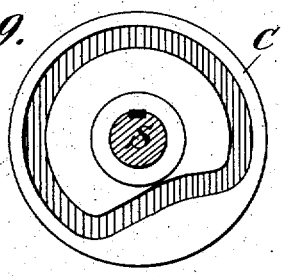

Owing to the adjustability of the feed-clamp previously mentioned, the same can be regulated so as to coact with various adjustments of the mold. As soon as the mold is filled with tobacco from the throat $b$ by the forward movement of the feed-clamp a vertically-reciprocating knife F descends and cuts off the tobacco at the mouth of the throat, the cutting-knife remaining in lowered position, so as to close the mouth of the throat $b$ and prevent the escape of tobacco from the same and from the mold E. The vertically-reciprocating motion of the cutting-knife F is produced by an oscillating lever $f$, that is pivoted at the front end to the supporting-frame A and acted upon by a cam-groove of the cam $C^3$, as shown in Fig. 11. The rear end of the lever $f$ is pivotally connected by an adjustable screw-rod $f^2$ with the shank of the knife, the rod $f^2$ being formed of two sections connected by a sleeve having a right and left hand screw-thread, so that the stroke of the cutting-knife can be accurately adjusted. The rod $f^2$ is pivoted to the shank of the knife, as shown in Figs. 1, 2, and 4. The sides of the knife F move in fixed ways $f^4$, so that the knife is guided in its vertically-reciprocating motion.

Figure 12:
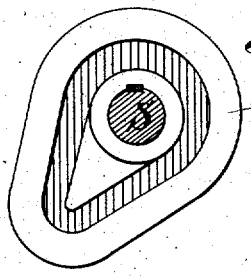
Figure 10:
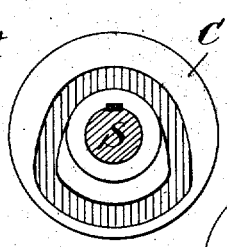
Figure 13:
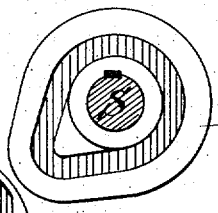

As soon as the tobacco packed in the bunch-mold E has been separated from the remainder by the cutter the mold E is moved downward and outward along a segmental cover $E^\times$, which is supported on arms $e^\times$ of the main frame A and connects the mouth of the throat $b$ with the rolling-table G, so that the mold will be kept closed and the tobacco therein maintained in its compressed condition in its motion to the said rolling-table. The mold E receives its downward and outward and then return motion by means of a cam $C^4$, (shown in Fig. 8,) which engages a vertically-reciprocating rack-bar $e^5$, which is guided by its fork-shaped upper end along the shaft S. The rack-bar $e^5$ meshes with a toothed segment $e^6$, which is keyed to a crank-shaft $e^7$, that is attached by arms $e^8$ rigidly to the mold-carrier $E^3$, which incloses the mold-box E′ and shell $E^2$ and serves to guide the latter by means of grooved ways on ribs of the former. The rack-bar $e^5$, segment $e^6$, and arms $e^8$ swing the mold until the same arrives in a position vertically above the pocket $g$ of the rolling-table G, as shown in Fig. $7^a$. When the mold is in this position, the box E′ and shell $E^2$ are projected below the carrier $E^3$, which motion is produced by the cams $C^6$ and $C^5$, which are shown in Figs. 12 and 13, and the connecting-rods $e^9$, $e^{10}$, $e^{11}$, and $e^{12}$. When the shell $E^2$ is lowered, it makes contact with the edges of the pocket $g$. Its motion is accomplished by the cam-groove of the cam $C^6$, which groove engages the vertically-guided rod $e^{11}$, which is connected by a pivot-arm $e^{12}$ to the shell $E^2$, so that when the rod $e^{11}$ and arm $e^{12}$ are vertically in line with each other and with the pocket $g$ the cam $C^6$ will lower the shell $E^2$. In a similar manner the mold-box E′ is actuated by a cam $C^5$, rod $e^9$, engaged by the groove of the cam $C^6$, Fig. 12, and a pivot-arm $e^{10}$, applied to the mold-box E′, the latter being lowered into the pocket $g$ simultaneously with the descending motion of the shell $E^2$, as shown in Fig. $7^b$. The greater stroke of the mold-box E′ is produced by the greater eccentricity of the groove of the cam $C^5$, the motions of the shell and mold-box serving to deposit the tobacco into the pocket of the rolling mechanism without giving it a chance to expand and change its shape. As soon as this is accomplished the bunch-forming roller begins its motion and rolls the tobacco into the bight of the rolling-apron. Immediately before the motion of the bunch-forming roller commences the mold-box E′ is first retracted into the shell $E^2$ and then lifted with the same into line with the lower edge of the segmental mold-cover $E^\times$ by the cams $C^6$ $C^5$, after which the mold is returned by the carrier $E^3$, cam $C^4$, rack-bar $e^5$, and toothed segment in an inward and upward direction along the mold-cover $E^\times$ to its normal position in line with the throat $b$.

The bunch-rolling device consists of the table G, the reciprocating roller G′, and the rolling-apron $G^2$. The table G is constructed of a middle stationary portion $g'$ and hinged and vertically adjustable side portions $g^2$ $g^2$, which latter are raised to varying angles of inclination to the middle portion by suitable set-screws $g^3$, so that the shape of the rolling-table corresponds in its general outline to the shape of the bunch and the contour of the mold. The ends of the roller G′ are applied to the slotted lower ends $g^4$ of a fork-shaped lever $G^3$, which is fulcrumed to the supporting-frame A, while its upper end is engaged by a cam $C^7$. (Shown in Fig. 9.) The roller G′ is guided in slotted guide-frames $g^5$ at both sides of the rolling-table G, as shown in Figs. 1 and 2. At the end of the rolling-table G are arranged hinged and spring-actuated fingers $g^6$, provided with projecting rests, to which the finished bunch is delivered from the bight of the rolling-apron. The side guide-frames $g^5$ are capable of vertical adjustment by means of slotted lugs $g^7$, which are guided on upright lugs $g^8$ of a platform $A^3$, supported on the bracket A′, so that the roller-guides can be adjusted higher or lower, according to the position of the hinged side portions of the rolling-table.

The rolling mechanism forms the subject-matter of United States Patent No. 411,919, issued to me on my application filed October 1, 1888.

The bunch is transferred from the rolling device to the mold and finished by rolling a wrapper around the same in the usual manner.

By means of the bunch-shaped mold and the compressive feed and separating mechanism herein described the large-sized scraps of tobacco are worked up into the proper bunch form, and by the peculiar bunch-discharging mechanism retained in such compressed shape while delivered to the rolling mechanism, so that bunches of uniform shape and consistency are obtained, which closely resemble bunches made by hand.

The yielding sectional character of the mold greatly contributes to the even packing of the filler therein, so that the tobacco will be uniformly distributed through the bunch, and the adjustability of the mold and of the feeding mechanism permits bunches of different sizes and shapes to be made by the same machine. Further, the described arrangement of the feeding mechanism with respect to the rolling mechanism and of the transfer mold leaves the rolling mechanism readily accessible and observable for adjustment and regulation.

I claim as my invention—

1. The combination, with a bunch-mold, of a feed-throat leading thereto, a platen-like feed-clamp reciprocating longitudinally and vibrating laterally in the said throat to intermittingly compress the filler and force it toward the mold, a cutter to separate the molded filler from the remainder, and means for discharging the bunch from the mold, substantially as described.

2. The combination, with a bunch-mold, of a feed-throat tapering toward the mold, a feed-clamp having a platen-like engaging face maintained at an inclination corresponding to the taper of the throat and working intermittingly in the said throat, a cutter to separate the molded filler, and a bunch-discharging device, substantially as described.

3. The combination, with a supply-hopper, a bunch-mold, and a feed-throat leading from the hopper to the mold, of a feed-wheel to feed the filler from the hopper through the throat, a platen-like feed-clamp operating in the throat to compress successive areas of the filler and to force the filler intermittingly toward the mold, a cutter to separate the molded filler, and a bunch-discharging device, substantially as described.

4. The combination, with a bunch-mold composed of a plurality of relatively movable sections, of a feed-throat leading to said mold, a feeding mechanism in said throat to force the filler intermittingly toward said mold, a cutter for separating the molded filler, and a bunch-discharging device, substantially as described.

5. The combination, with a bunch-mold and a feed-throat leading thereto having a lateral opening, of a platen-like feed-clamp reciprocating longitudinally in said opening, and a cover-plate constantly closing the varying opening between the moving feed-clamp and the wall of the throat and yielding to the motion of the feed-clamp, substantially as described.

6. The combination, with a bunch-mold, a feed-throat, a feeding mechanism to pack the filler in the mold, a cutter to separate the molded filler, and a rolling mechanism, of a shell inclosing the mold, a mold-carrier oscillating from the feed-throat to the pocket of the rolling mechanism, and mechanism whereby the mold and shell are projected differentially from the carrier into the pocket, substantially as described.

7. The combination, with a feed-throat, a feeding mechanism, a cutter to separate the molded filler, and a rolling mechanism, of a mold composed of a plurality of sections, a mold-box, a shell inclosing the mold-box, a mold-carrier having shell-guides, and means for swinging the mold-carrier from the feed-throat to the pocket of the rolling mechanism and for projecting the mold-box and shell on the carrier into said pocket, substantially as described.

8. The combination, with a bunch-mold, of a feed-throat, a platen-like feed-clamp reciprocating in the feed-throat, feed-clamp-operating mechanism by which the face of the feed-clamp is maintained in engagement with the tobacco during its forward movement, and adjustable connections between the feed-clamp and its operating mechanism for adjusting the stroke of the feed-clamp while maintaining it in said engagement, substantially as described.

In witness whereof I have hereunto set my hand in the presence of two witnesses.

FERDINAND J. HAGEN.

Witnesses:
CLARENCE L. BUGER,
BURNHAM KALISCH.